Aug. 11, 1925.  1,549,479
A. T. FLOWER
AUTOMOBILE JACK
Filed March 19, 1924   2 Sheets-Sheet 1
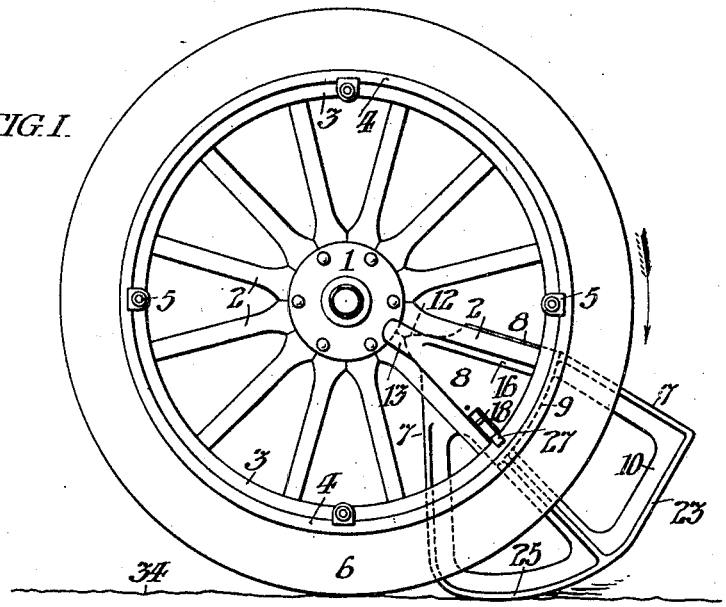
FIG. I.
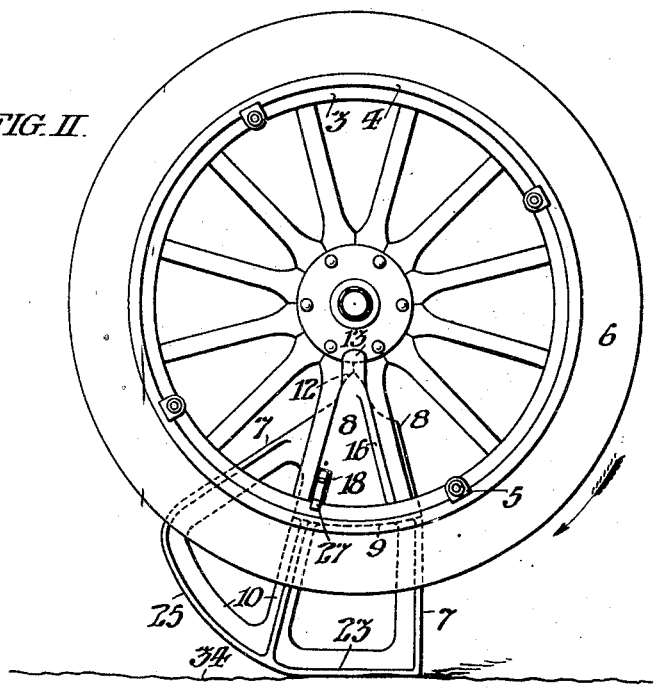
FIG. II.
Inventor:
ARCHIBALD THOMAS FLOWER

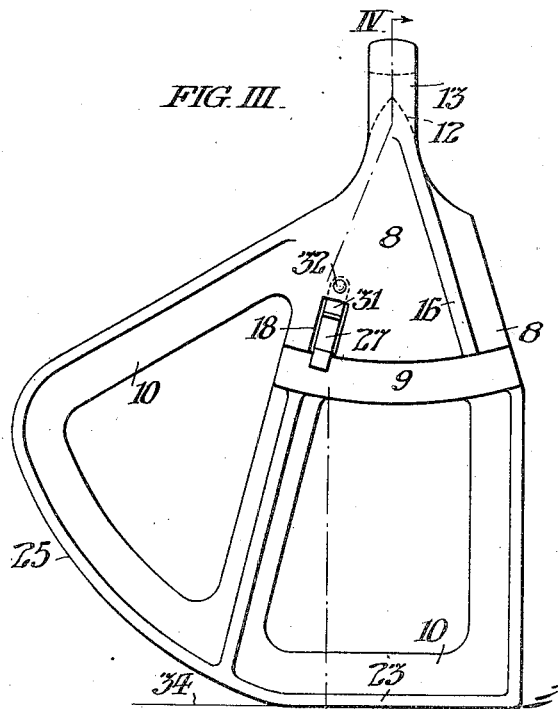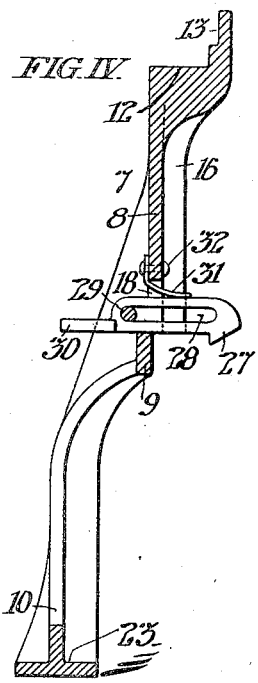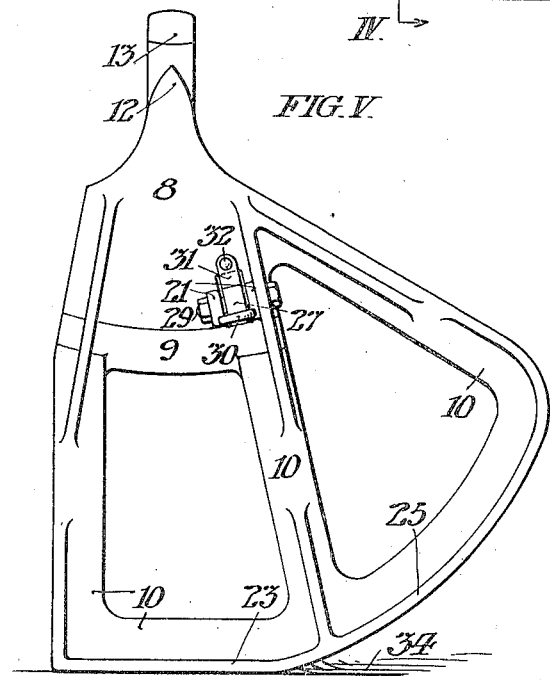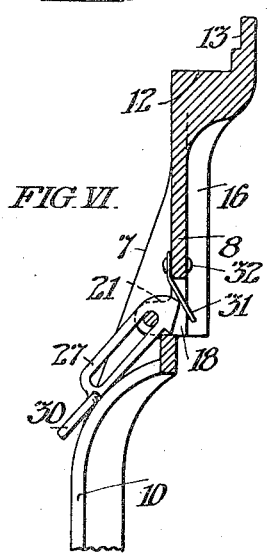

Patented Aug. 11, 1925.

1,549,479

UNITED STATES PATENT OFFICE.

ARCHIBALD THOMAS FLOWER, OF JENKINTOWN, PENNSYLVANIA.

AUTOMOBILE JACK.

Application filed March 19, 1924. Serial No. 700,198.

*To all whom it may concern:*

Be it known that I, ARCHIBALD THOMAS FLOWER, a citizen of the United States, residing at Jenkintown, in the county of Montgomery and State of Pennsylvania, have invented a certain new and useful Improvement in Automobile Jacks, whereof the following is a specification, reference being had to the accompanying drawings.

My invention relates to lifting devices of the type adapted to utilize movement of the vehicle for raising one or more of the vehicle wheels to permit the tires to be removed from the wheels, or the wheels removed from the axles.

As hereinafter described, my invention includes a single sectoral casting, so constructed and arranged that it may be temporarily attached to a vehicle wheel as a cam which rotation of the wheel brings into contact with the ground and causes the wheel to ride up on the cam and thus elevate the wheel and axle. Prior devices of that general character with which I am familiar, either require bolt holes to be made through the felly to connect the cam member with the wheel or have a wedging action between adjoining spokes of such character that when the weight of the vehicle is placed upon the jack, it tends to spread the spokes apart and shear them off, or the cam member of the device is a separate base which must be manipulated independently of the support by which the wheel is upheld. My improvement is advantageous in that no bolt holes are required to be made in the wheel, the jack is arranged to effect its lifting function without wedging action between adjoining spokes, and the cam member is in unitary rigid relation with the member which supports the weight.

As hereinafter described, my invention includes a single casting comprising the cam and the support, and having a rigid lug and a pivoted latch adapted to extend between adjoining spokes from the inside to the outside of the wheel, and respectively detachably engage the latter at the hub and at the felly.

My invention includes the various novel features of construction and arrangement hereinafter more definitely specified.

In said drawings: Fig. I is a side elevation of an automobile wheel with a jack embodying my invention temporarily connected therewith preliminary to its lifting operation.

Fig. II is a side elevation of said wheel and jack in position in which the wheel has been elevated by rotation of the wheel and consequent movement of the automobile.

Fig. III is an outside elevation of said jack shown in Figs. I and II, but on a larger scale.

Fig. IV is an irregular vertical sectional view of the same, taken on the line IV, IV in Fig. III; the latch lever being in its operative position, wherein it is adapted to snap into engagement with the wheel rim.

Fig. V is an inside elevation of said jack.

Fig. VI is a fragmentary sectional view, similar to Fig. IV, but with the latch lever withdrawn to the inoperative position in which the device may be packed in less space than when said lever is in the position shown in Fig. IV.

The automobile wheels shown in Figs. I and II have hub members 1, spokes 2, fellies 3, removable rims 4, normally secured by clamps 5, and provided with resilient tires 6. The lifting jack includes a single sectoral casting 7 comprising three plane webs best shown at 8, 9 and 10 in Fig. IV, extending in respective parallel planes transversely to the wheel axis. Said casting 7 has an axial portion 12, extending at right angles to the planes of said webs, as indicated in Figs. IV and VI, and outwardly from the outermost of said webs and constructed and arranged to fit between a pair of wheel spokes as shown in Figs. I and II. The sides of said axial member 12 are tapered so that it is adapted to bear upon the base portions of the two adjoining spokes between which it is fitted. Said axial member has a stepped lug 13 extending therefrom, parallel with the planes of said webs, and radially inward with respect to the wheel axis and arranged to overlap and contact with the outer surface of said wheel hub member 1, as shown in Figs. I and II. Said jack casting 7 has the substantially radial rib 16 projecting outwardly from the outermost plane web 8, arranged to bear against the inner side of one of the pair of spokes between which the jack is fitted. The substantial radial slot 18 extends through said webs 8 and 9, which latter comprises an arcuate member fitted to bear against the inside of said wheel felly 3. Said slot 18 is provided upon respectively opposite sides with inwardly projecting parallel lever pivot lugs 21, best shown in Figs. V and VI which reinforce the junction of said webs 8 and 9. Said jack casting 7 has a perimetral member 23 of T cross section, on the innermost web 10, as best shown in Fig. IV, comprising a straight base portion tangential to a circle concentric with said wheel but of greater radius than said wheel tire 6, and a cam portion 25 substantially involutely curved with reference to the wheel axis, as best shown in Figs. I and II.

The latch lever 27 extends through said slot 18 in the plane web 8 of said jack casting 7, as best shown in Fig. IV, and has an elongated fulcrum slot 28 to receive the fulcrum bolt 29, which extends through said lever in engagement with said pivot lugs and is the fulcrum pivot upon which said lever may be rocked and slid from the idle position shown in Fig. VI to the operative position shown in Fig. IV. Such movement may be conveniently effected by manipulation of the handle 30 on said lever 27. As indicated in Figs. I and II, said lever 27 is fitted to extend through the wheel between adjoining spokes 2, from the inner side of the wheel, and to engage the outer edge of the felly 3. The spring 31 is rigidly connected at its inner end to the inner side of said plane web 8 by the single rivet 32, but is conveniently extended outwardly through said slot 18, so that it is prevented from turning around on said rivet and is arranged to normally press said lever 27 toward said felly 3 when in the position shown in Fig. IV. However, said slot 28 permits said lever to be withdrawn to the inoperative position shown in Fig. VI in which it is more convenient to transport the jack.

It is to be understood that said jack casting 7 is thus constructed and arranged so that it may be detachably fitted to the wheel of an automobile, or other vehicle, in position to primarily sustain the weight by a single one of the two spokes 2 between which said lug 13 is fitted. As shown in Figs. I and II; that spoke 2 then rests upon said rib 16 as indicated in Fig. I, independently of the other of said spokes, until said wheel is turned in the direction of the arrows, from the position shown in Fig. I to the position shown in Fig. II, which turning movement shifts the load from said rib 16 to said axial portion 12 of the jack which then supports the weight by bearing upon the inner base portions of both spokes between which said jack is fitted, as best shown in Fig. II. Such turning movement lifts the wheel by said jack as said cam portion 25 of the latter rolls in contact with the ground, until the jack rests upon its tangential base portion 23, with the tire 6 above the ground 34, as shown in Fig. II.

I have found it convenient to explain my invention with reference to a form thereof especially designed and adapted to fit the wheels of "Ford" automobiles. However, it is obvious that a lifting jack having the essential characteristics of my invention may be so proportioned as to be applicable to wheels of other types.

Therefore, I do not desire to limit myself to the precise details of construction and arrangement herein set forth, as it is obvious that various modifications may be made therein without departing from the essential features of my invention, as defined in the appended claims.

I claim:

1. An automobile jack comprising a single cast metal body having an axial portion arranged to fit between a pair of wheel spokes from the inner to the outer portion thereof, and having an arcuate perimeter in eccentric relation with said axial portion; a latch lever carried by said body and movable radially with respect to said axial portion; means permanently pivotally connecting said latch lever with said body; and a spring, carried by said body, arranged to press said lever radially outward; whereby said latch lever is adapted to engage the wheel rim, to hold said body in cooperative relation with the wheel.

2. An automobile jack comprising a single cast metal body having an axial portion arranged to fit between a pair of wheel spokes from the inner to the outer portion thereof, and having an arcuate perimeter in eccentric relation with said axial portion; a latch lever carried by said body and movable radially with respect to said axial portion; means permanently pivotally connecting said latch lever with said body; and a spring, carried by said body, arranged to press said lever radially outward; whereby said latch lever is adapted to engage the wheel rim, to hold said body in cooperative relation with the wheel; said lever having a longitudinal slot for engagement with its pivot means, permitting said lever to be reciprocated longitudinally in engagement with its pivotal support, for engagement with wheel rims of different thickness.

3. An automobile jack comprising a metal body having a sectoral perimeter and having an axial portion arranged to engage a wheel hub between adjoining spokes; said body including a web, extending parallel with the plane of the wheel and having an opening therethrough for a latch lever; a latch lever mounted to reciprocate in said opening transversely with respect to the plane of the wheel; and a fulcrum bolt extending through said lever, in permanent engagement with said body; in such relation that the radially outer side of said opening serves as a stop for the movement of said latch lever; and a spring, carried by said body, arranged to press said lever toward said stop.

4. An automobile jack comprising a metal body having a sectoral perimeter and having an axial portion arranged to engage a wheel hub between adjoining spokes; said body including a web, extending parallel with the plane of the wheel and having an opening therethrough for a latch lever; a latch lever mounted to reciprocate in said opening transversely with respect to the plane of the wheel; and a fulcrum bolt extending through said lever, in permanent engagement with said body; in such relation that the radially outer side of said opening serves as a stop for the movement of said latch lever; and a spring, carried by said body, arranged to press said lever toward said stop; said lever having a longitudinal slot through which said fulcrum bolt extends, whereby said lever may be oscillated upon said bolt and reciprocated transversely with respect thereto, for engagement with a wheel rim.

5. An automobile jack comprising a cast metal frame having, at one end, means arranged to engage the hub of a wheel between its spokes and having, at the other end, an arcuate perimeter in eccentric relation with the wheel, and a web extending parallel with the plane of the wheel and having an opening through said web; and a latch lever pivotally mounted in said opening and having one end inclined; the fulcrum of said lever being so placed that one side of said opening through said web serves as a stop limiting the movement of said lever; and a spring arranged to press said lever toward said stop; whereby said lever is arranged to automatically engage the wheel rim when said jack is drawn outwardly with its axial portion in engagement with the wheel hub.

In testimony whereof, I have hereunto signed my name at Philadelphia, Pennsylvania, this twelfth day of March, 1924.

ARCHIBALD THOMAS FLOWER.